E. R. CROSS.
WEIGHING SCALE.
APPLICATION FILED JAN. 26, 1917.

1,277,698.

Patented Sept. 3, 1918.

Inventor:
Edmund R. Cross
By Francis J. Dakin
Atty

UNITED STATES PATENT OFFICE.

EDMUND R. CROSS, OF BOSTON, MASSACHUSETTS.

WEIGHING-SCALE.

1,277,698.  Specification of Letters Patent.  Patented Sept. 3, 1918.

Application filed January 26, 1917. Serial No. 144,775.

*To all whom it may concern:*

Be it known that I, EDMUND R. CROSS, a citizen of the United States, residing at Boston, in the county of Suffolk and State of Massachusetts, have invented a new and useful Improvement in Weighing-Scales, of which the following is a specification, reference being had therein to the accompanying drawings.

My invention relates to weighing scales and more particularly to the various forms of scales having weight indicating dials or charts of different forms.

In such scales the means provided for operating the weight indicating means is generally accompanied by either friction or lost motion which impairs the accuracy of the scales. This is especially true where the indicating means is operated by a rack and pinion construction. If the rack and pinion are constructed with close fitting teeth to avoid lost motion, then undue friction is apt to result, otherwise when friction is avoided by large teeth, lost motion ensues.

The main object of my invention is to provide means for operating the indicating mechanism in dial or chart scales which is entirely free from both friction and lost motion and thereby to increase the efficiency and accuracy of the scales.

A further object of the invention is to simplify the construction of such scales and thereby reduce the cost of manufacture.

Other and additional objects of the invention will be more specifically set forth and described hereinafter.

Figure 2:
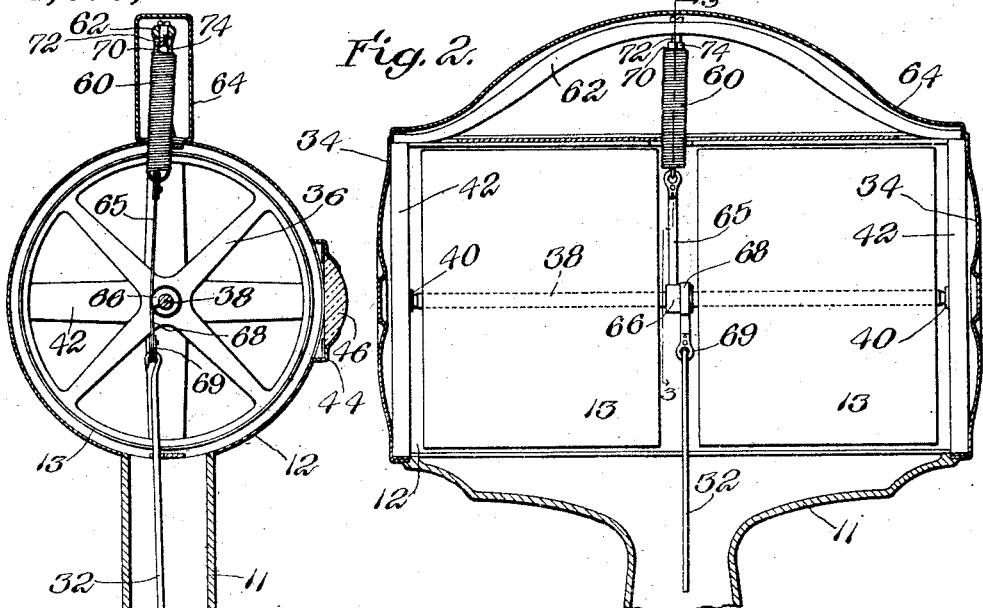
Figure 1:
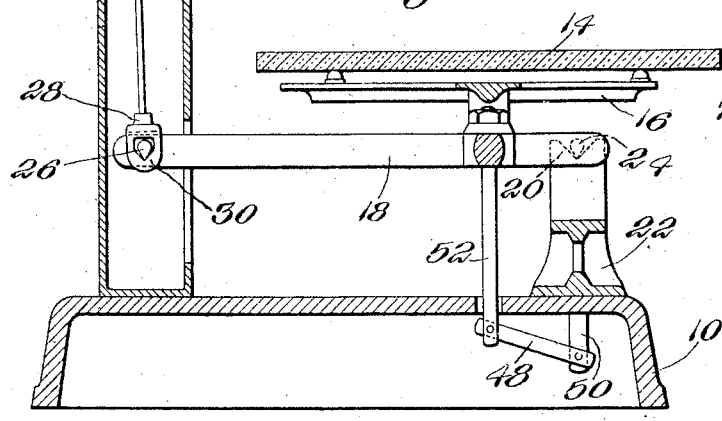
Figure 3:
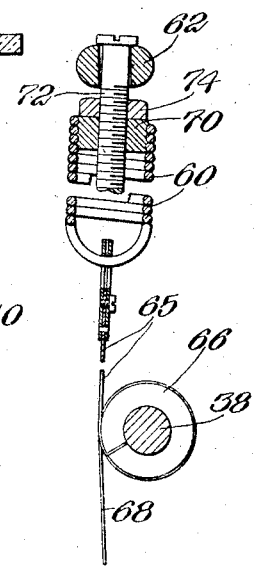
Figure 4:
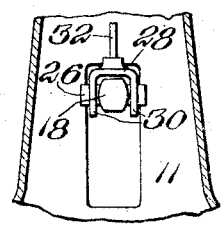

In the drawings illustrating my invention applied to a rotary dial scale commonly called a "drum" scale, Figure 1 is a central longitudinal sectional view of a drum scale constructed and operated in accordance with my invention; Fig. 2 is a front elevation partly in section of the "drum" dial showing the operating mechanism therefor; Fig. 3 is a central vertical sectional view on line 3—3 in Fig. 2 on an enlarged scale and Fig. 4 is a detail view of the connection of the scale-beam to the means for operating the indicating means.

In the drawings, my invention is illustrated as applied to what is commonly called in the scale art a "drum" scale. This is merely one exemplification of the invention for it may be applied to various types of scales having different forms of dials and charts and indicating mechanisms.

Referring to the drawings showing my invention applied to one type of scale as above stated, 10 designates the base of the scale having an upright column 11 carrying a cylindrical casing 12 within which is rotatably mounted a cylindrical chart or dial 13. A scale platform 14 is supported upon a suitable spider 16 which in turn is supported by a scale-beam 18 fulcrumed in suitable bearings 20 carried by a bracket 22 on the forward part of the base 10.

The scale-beam may be of any desirable form and is provided with knife-edge bearings 24 at its forward end resting in the bearings 20. The rear end of the scale-beam is provided on each side with a laterally extending knife-edge bearing 26 engaging a suitable bearing 30; these two bearings being carried by a yoke 28 secured on the end of a vertical rod 32 connected to the operating mechanism for the dial in order to rotate the dial when the scale-beam is depressed by a weight on the platform.

The cylindrical casing 12 is provided with end caps 34 removable to permit access to the interior of the chart. The cylindrical chart may be of any suitable construction and generally consists of paper wound on a series of skeleton supports 36 fixed on a spindle 38 which is journaled in suitable bearings 40 carried by end frames 42, one at each end of the casing 12. As shown, the chart is preferably made in two sections separated in the center to permit of the operating mechanism being located at that point but the chart may be made in one piece with the operating mechanism located at one end. The chart may be suitably marked with figures denoting weight and money values. In front of the chart is a longitudinal horizontal frame inclosing a magnifying glass 46 to magnify the graduations and markings on the chart to facilitate readings.

In order to maintain the scale platform 14 in a horizontal position when the scale-beam is depressed, a check rod 48 is attached at one end to a depending bracket 50 on the base of the frame and at the other end to a rod 52 fixed to the spider 16 carrying the scale platform.

All of the foregoing construction is old and well known in the art. The novel features of my invention reside in the means provided for operating the cylindrical chart from the scale-beam or by the movement of the scale-beam.

The preferred form of such means consists of a spring 60 secured at its upper end to an arched support 62 mounted in a casing 64 on the top of the cylindrical casing 12. The lower end of the spring is attached to one end of a strap 65, the other end of which is secured to a wheel or roll 66 fastened to the spindle 38. To the roll 66 is also secured, in offset relation to the first strap, a second strap 68 the lower end of which is provided with a loop 69 to receive the hooked end of the rod 32. The spring 60 is provided at its upper end with a nut 70 through which is threaded a screw 72, the latter being supported by its head in the arched support 62. By turning the screw 72 to the right or left, the spring 60 may be drawn upwardly or lowered, thereby adjusting the chart through the medium of the strap 65 to the zero point. A check-nut 74 is provided to lock the screw in any adjusted position.

The straps 65 and 68 are so arranged with relation to the roll that when the chart is in a normal zero position the strap 65 is in an unwound relation to the roll and the strap 68 in a wound relation to the roll, and always when the chart is rotated one strap is unwound and the other wound up on the roll. The various parts of this operating mechanism are so adjusted that there is no lost motion and, of course, no friction impairing the accuracy of weight indication.

In the operation of my scale, the ordinary adjustments are first made so that the normal position of the chart when there is no weight upon the scale platform, is at zero, this adjustment being made by means of the screw 72. When an object is placed on the scale platform the scale-beam is depressed around the bearing 20 as a center, thereby causing the rear end of the scale-beam to drop, pulling down the rod 32 and unwinding the strap 68 and rotating the chart 13. The rotation of the chart 13 and thereby the roll 66 causes the strap 65 to be wound up on the roll 66 and the spring 60 to be distended until the tension of the spring equals the weight upon the scale platform in its effect upon the scale-beam. When the weight is removed from the scale platform the spring 60 retracts, unwinding the strap 65 from the roll 66 and winding up the strap 68 and thereby, through the medium of the rod 32, returning the scale-beam to its normal position.

It will be observed that by the use of my invention the ordinary rack and pinion construction which heretofore has been in general use for operating a drum chart or dial, is done away with. The device of my invention, it is apparent, is entirely free from friction which would impair the accuracy of weight indication or lost motion, the straps 65 and 68 being made of thin, very flexible metallic ribbon. It is also to be noted that the spring 60 acts as the weight resisting element, so far as the scale-beam is concerned, and that by the use of this construction I am enabled to reduce the number of parts in the scale, simplify its construction, and finally to reduce the number of bearing parts and thereby eliminate a large amount of the friction ordinarily found in scales of this construction.

Although I have shown my invention as applied to a drum scale, it is obvious that it may be applied to other forms of scale with great advantage by making slight changes apparent to one skilled in the art. Furthermore, the invention is not to be limited to the particular form shown but may be embodied in other forms of construction all within the purview of the invention and I desire to claim the invention broadly except where specifically limited in the following claims.

What I claim is:—

1. In a scale a combination of a scale-beam, a support for the object to be weighed, a load opposing element, means for indicating weight, and means whereby said indicating means is operated by movement of said scale-beam; said last mentioned means comprising two thin flexible straps each secured at one end to said indicating mechanism, one of said straps being attached at the other end to said load opposing element and the other of said straps being connected to the said scale-beam; said straps being so arranged that as one is unwound the other is wound up and vice versa.

2. A scale comprising a spring secured to a fixed support, means for indicating weight, a support for the material to be weighed, a roll mounted on said indicating means, a strap having one end secured to the said roll and the other end secured to said spring, a second strap having one end secured to said roll in an offset relation to said first mentioned strap and having its other end connected to said scale-beam; said straps being so arranged that normally when said indicating means is at the zero point the second of said straps is wound up on said roll and the first of said straps is in an unwound relation.

3. In a scale, in combination, a scale-beam, means for indicating weight, a load opposing element comprising a spring, means whereby said weight indicating means is operated by the movement of said scale-beam comprising a roll mounted on said indicating means, a thin flexible strap having one end secured to said roll and the other end secured to said spring, a second thin flexible strap having one end secured to said roll in staggered relation to said first strap and the other end connected to said scale-beam, said straps being so arranged that normally, when said indicator is at zero point, the second of said straps is wound up on said roll and the first strap is in unwound relation.

4. In a scale, in combination, a scale-beam, a drum cylinder for indicating weight, having a spindle rotating with said drum in suitable bearings, a roll mounted on said spindle, a spring secured at one end to a fixed support on the scale and adapted to act as a load opposing element, a strap having one end secured to said roll and the other end secured to said spring, a second strap having one end secured to said roll in an offset relation to said first mentioned strap and having its other end connected to said scale-beam, said straps being so arranged that normally, when said indicator means is at zero point, the second of said straps is wound up on said roll and the first of said straps is in unwound relation.

In witness whereof, I hereunto set my hand this twenty-fourth day of January, 1917.

EDMUND R. CROSS.

Copies of this patent may be obtained for five cents each, by addressing the "Commissioner of Patents, Washington, D. C."